US012515593B2

(12) United States Patent
Sakurai (10) Patent No.: US 12,515,593 B2
(45) Date of Patent: Jan. 6, 2026

(54) VEHICLE-MOUNTED RETRACTABLE DISPLAY DEVICE

(71) Applicant: TOYOTA JIDOSHA KABUSHIKI KAISHA, Aichi-ken (JP)

(72) Inventor: Hideyuki Sakurai, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 186 days.

(21) Appl. No.: 18/418,337

(22) Filed: Jan. 22, 2024

(65) Prior Publication Data

US 2024/0246495 A1    Jul. 25, 2024

(30) Foreign Application Priority Data

Jan. 24, 2023  (JP) .................................. 2023-008479

(51) Int. Cl.
*B60R 11/02* (2006.01)
*B60K 35/22* (2024.01)
*B60R 11/00* (2006.01)

(52) U.S. Cl.
CPC ........ *B60R 11/0229* (2013.01); *B60K 35/223* (2024.01); *B60R 2011/0028* (2013.01); *B60R 2011/0071* (2013.01); *B60R 2011/0082* (2013.01); *B60R 2011/0084* (2013.01)

(58) Field of Classification Search
CPC ...... B60K 35/00; B60K 35/22; B60K 35/223; B60K 35/53; B60R 11/0229; B60R 11/0235; B60R 2011/0028; B60R 2011/0071; B60R 2011/0082; B60R 2011/0084
See application file for complete search history.

(56) References Cited

FOREIGN PATENT DOCUMENTS

JP        2005349977 A  * 12/2005
JP        2015047885 A  *  3/2015

* cited by examiner

*Primary Examiner* — Charles J Han
(74) *Attorney, Agent, or Firm* — HAUPTMAN HAM, LLP (57) ABSTRACT

The vehicle-mounted retractable display device comprises a flexible display, a guide rail, a display-side engagement component, and a floor-side engagement component. The display-side engagement component is disposed at a lower end of the flexible display. The floor-side engagement component is disposed in a lower region of the vehicle compartment and configured to engage the display-side engagement component.

4 Claims, 7 Drawing Sheets

VEHICLE-MOUNTED RETRACTABLE DISPLAY DEVICE

CROSS REFERENCE TO RELATED APPLICATION

This application claims priority to Japanese Patent Application No. 2023-008479, filed on Jan. 24, 2023, which is incorporated herein by reference in its entirety including the specification, claims, drawings, and abstract.

BACKGROUND

In this specification, a vehicle-mounted retractable display device is disclosed.

For example, in JP 2005-349977 A, a flexible display is mounted on a vehicle. A storage portion is provided in a ceiling above the rear seat. The storage section includes a rail and a motor. A pair of rails is disposed at both ends of the vehicle room ceiling in the vehicle width direction. When the motor is driven, the flexible display is pulled out to the front of the rear seat while being guided by the pair of rails.

In some cases, the window in the vehicle compartment is open when the flexible display is used. In this case, the flexible display may be waved by wind entering the vehicle compartment.

In this specification, there is disclosed a vehicle-mounted retractable display device capable of suppressing the waving of the flexible display when the flexible display is used.

SUMMARY

In this specification, a vehicle-mounted retractable display device is disclosed. The apparatus comprises a flexible display, a guide rail, a display-side engagement component, and a floor-side engagement component. The flexible display is disposed in a vehicle compartment. And the flexible display extends a vehicle width direction. The guide rail is disposed on a ceiling of the vehicle compartment. The guide rail guides movement of the flexible display from a retracted position to a spread position. In the retracted position, the flexible display rests on the ceiling, and in the spread position, the flexible display is pulled down to a region in front of a seat. The display-side engagement component is disposed at a lower end of the flexible display. The floor-side engagement component is disposed in a lower region of the vehicle compartment and configured to engage the display-side engagement component.

According to the above configuration, the lower end of the flexible display is engaged with the floor side. As a result, the waving of the flexible display is suppressed.

In the above structure, the floor-side engagement component may comprise a pair of hold pins, in which a first hold pin in the pair of hold pins is disposed on one end, in the vehicle width direction, of the floor-side engagement component, and a second hold pin is disposed on the other end, in the vehicle width direction, of the floor-side engagement component. Each of the pair of hold pins comprises a head and a biasing component, the head is movable in the vehicle width direction, and the biasing component is configured to bias the head inward in the vehicle width direction. The display-side engagement component may comprise a pair of guide pieces, in which a first guide piece in the pair of guide pieces is disposed at a lower end on one end, in the vehicle width direction, of the flexible display, and a second guide piece in the pair of guide pieces is disposed at a lower end on the other end, in the vehicle width direction, of the flexible display. Each guide piece in the pair of the guide pieces comprises an insertion groove having a lower opening into which the head of the hold pin is inserted. The head is tapered toward an inner region in the vehicle width direction. The insertion groove has a tapered contour, and has the groove width getting narrower toward the inner region in the vehicle width direction.

According to the above configuration, the guide piece and the hold pin engage with each other. This makes it possible to position the flexible display in the front-rear direction and the vehicle width direction of the vehicle.

In this specification, the head may have a vertically elongated shape having a vertical dimension longer than a dimension in the front-rear direction of a vehicle.

According to the above configuration, rotation of the guide piece around the central axis of the hold pin can be suppressed.

In this specification, the display-side engagement component may comprise a lock pin disposed at the center, in a vehicle width direction, of the flexible display on a lower end thereof. The floor-side engagement component may comprise a pin receiving mechanism disposed at the center, in the vehicle width direction, of the floor-side engagement component. The pin receiving mechanism has a hollow structure, and has a receiving port which is open toward the ceiling. When the flexible display is secured, the lock pin is inserted into the pin receiving mechanism from the receiving port, and the lock pin is hooked on an inner wall of the pin receiving mechanism.

According to the above configuration, at the lower end of the flexible screen, the center portion in the vehicle width direction is engaged with the floor side in addition to both ends in the vehicle width direction.

In this specification, the insertion groove may be located below the lock pin. And the pair of the hold pins may be located below the receiving port. A separation distance between a lower end of the lock pin and a lower end of the insertion groove is equal to a separation distance between the receiving port and each of the pair of hold pins.

According to the above configuration, at the same time that the hold pin is inserted into the insertion groove of the lock pin, the lock pin is inserted into the receiving port. Thereby, the flexible display is rapidly fixed.

The vehicle-mounted retractable display device disclosed in this specification can suppress the waving of the flexible display when the flexible display is used.

BRIEF DESCRIPTION OF DRAWINGS

The perspective view of FIG. 1 shows of an illustrative example of the present embodiment in a high angle.

The perspective view of FIG. 2 shows of an illustrative example of the vehicle-mounted retractable display device according to the present embodiment in a low angle.

The perspective view of FIG. 3 shows of an illustrative example of the structure of the guide piece and the hold pin.

The perspective view of FIG. 4 shows of an illustrative example of the process (1/2) of engaging the lock pin with the pin receiving mechanism.

The perspective view of FIG. 5 shows of an illustrative example of the process (2/2) of engaging the lock pin with the pin receiving mechanism.

The perspective view of FIG. 6 shows of an illustrative example of the height positions of the lock pin and the insertion groove and the height positions of the receiving port and the hold pin.

The perspective view

DESCRIPTION OF EMBODIMENTS

Hereinafter, a vehicle-mounted retractable display apparatus according to the present embodiment will be described with reference to the drawings. The shapes, materials, numbers, and numerical values described below are illustrative examples. These examples can be appropriately changed according to the specifications of the vehicle-mounted retractable display device. In the following, the same reference numerals are given to the same elements in all the drawings.

In FIGS. 1 to 7, an orthogonal coordinate system including an FR axis, an LH axis, and an UP axis is used to represent the position and the direction of each component. The FR axis is a vehicle longitudinal axis whose positive direction is the front of the vehicle. The LH axis is a vehicle width direction axis whose positive direction is the left side of the vehicle. The UP axis is a vertical axis of the vehicle in which the upward direction is a positive direction.

<Vehicle Interior Structure>

Figure 1:
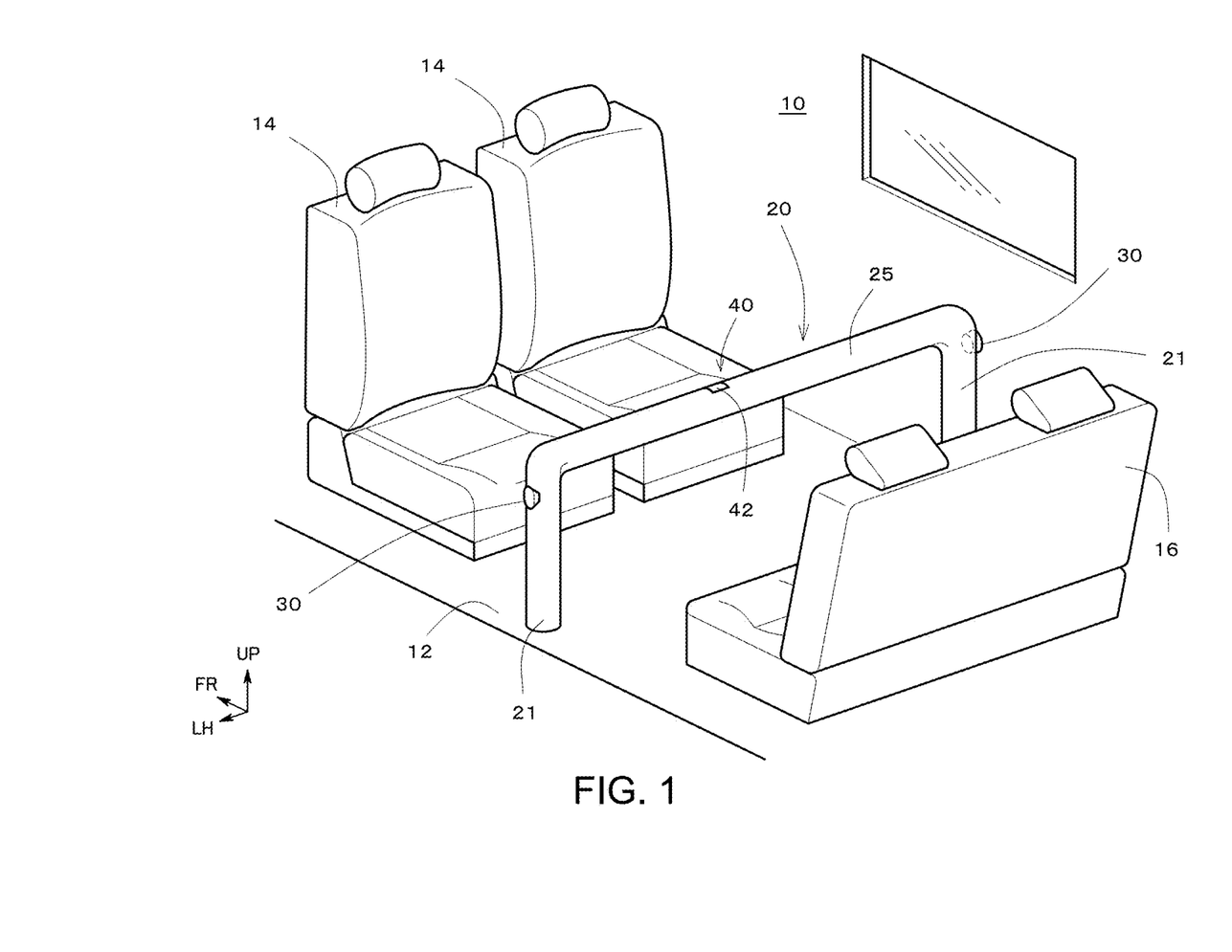
Figure 2:
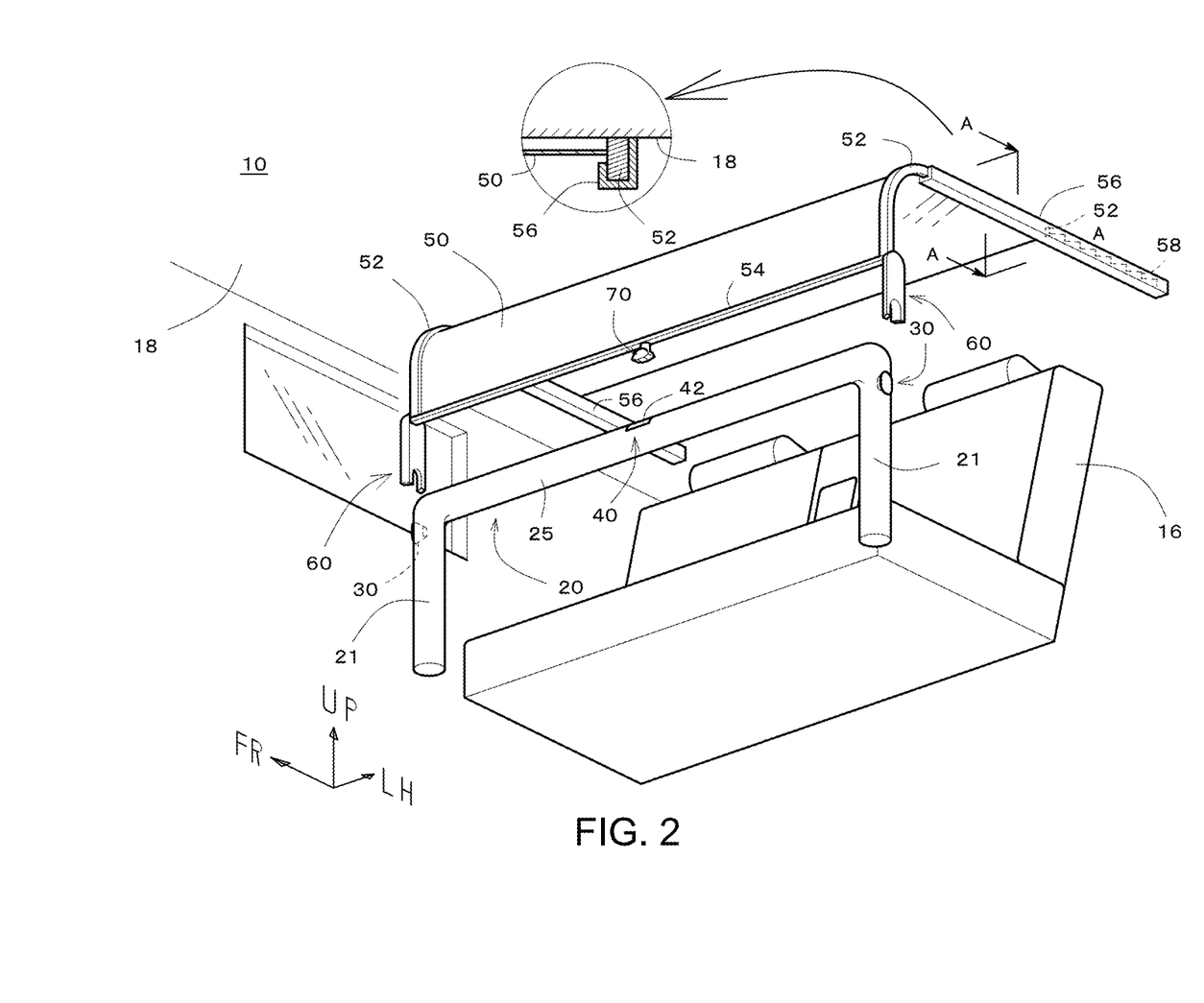

FIGS. 1 and 2 show an example of a structure in the vehicle compartment 10. A vehicle-mounted retractable display device according to the present embodiment is disposed in the vehicle compartment 10. As described later, the vehicle-mounted retractable display includes a flexible display 50, a pair of guide rails 56, 56, a pair of guide pieces 60, 60, a lock pin 70, a pair of hold pins 30, 30, and a pin receiving mechanism 40. A pair of guide pieces 60, 60 and a lock pin 70 are included in the display-side engagement component. The pair of hold pins 30, 30 and the pin receiving mechanism 40 are included in the floor-side engagement component.

In the example of FIGS. 1 and 2, a door is disposed only on one side of the vehicle compartment 10. For example, as illustrated in FIGS. 1 and 2, no door is provided on the right side of the vehicle compartment 10. A slide door (not shown), for example, is disposed on the left side of the vehicle compartment 10.

A pair of separation seats 14, 14 is disposed on the floor 12 of the vehicle compartment 10. The pair of separation seats 14 is a front sheet. The separation seats 14, 14 are positioned so as to face rearward, for example.

A bench seat 16 is disposed on the floor 12. The bench seat 16 is a rear sheet. The bench seat 16 is positioned to face forward, for example. In other words, the pair of separation seats 14, 14 and the bench seat 16 are disposed so as to face each other.

A handrail 20 is disposed on the floor 12 between the pair of separation seats 14, 14 and the bench seat 16. The handrail 20 is an auxiliary tool at the time of loading and unloading. For example, an occupant seated on the pair of separation seats 14, 14 and the bench seat 16 is grasped by the handrail 20 when the vehicle is lowered. The occupant then stands up from the seat.

The handrail 20 is composed of, for example, a metal pipe. The handrail 20 is formed by bending the pipe. The handrail 20 has a U-shaped shape opened downward. The handrail 20 includes a pair of vertical bars 21, 21 and a lateral bar 25. The pair of vertical bars 21, 21 is disposed at both ends of the floor 12 in the vehicle width direction. A lateral bar 25 connects the upper ends of the pair of vertical bars 21, 21. The lateral bar 25 extends along the vehicle width direction. A storage type table may be installed on the handrail 20. For example, the table can be rotated to a horizontal position and a vertical position using the lateral bar 25 as a rotation axis.

A floor-side engagement component is disposed on the handrail 20. The floor-side engagement component includes a pair of hold pins 30, 30 and a pin receiving mechanism 40. A hold pin 30 is disposed on each of the pair of vertical bars 21 and 21. As described above, the vertical bars 21 are disposed at both ends of the floor 12 in the vehicle width direction. Therefore, the hold pins 30 arranged on the vertical bar 21 are also arranged at both ends of the floor 12 in the vehicle width direction. A detailed structure of the hold pin 30 will be described later.

A pin receiving mechanism 40 is disposed in the lateral bar 25. For example, the pin receiving mechanism 40 is provided at the center of the lateral bar 25 in the vehicle width direction. That is, the pin receiving mechanism 40 is disposed at the center of the floor 12 in the vehicle width direction. The detailed structure of the pin receiving mechanism 40 will be described later.

<Vehicle Room Ceiling Structure>

FIG. 2 illustrates an example of a peripheral structure of the roof trim 18. The roof trim 18 is a ceiling panel of the vehicle compartment 10. A flexible display 50 and a guide rail 56 are disposed on the roof trim 18.

The flexible display 50 is disposed in the vehicle compartment 10. The flexible display 50 extends in the vehicle width direction. For example, the flexible display 50 extends over the entire width of the vehicle compartment 10 in the vehicle width direction. The length of the flexible display 50 is obtained by adding a predetermined margin to the height from the lateral bar 25 to the roof trim 18. The length of the flexible display 50 indicates the dimension of the vehicle in the longitudinal direction in the retracted position.

Here, the retracted position indicates a state in which the entire surface of the flexible display 50 rests on the roof trim 18. On the other hand, the spread position indicates a state in which the flexible display 50 is pulled down and the lower end thereof is engaged with the lateral bar 25. In the spread position, the flexible display 50 is pulled down to a region in front of the bench seat 16.

The flexible display 50 includes a substrate and a light emitting element. The substrate is flexible. For example, a plastic substrate is used. As the light emitting element, for example, an organic light emitting display element or a liquid crystal element is used. The flexible display 50 includes electric wires and signal wires (not shown). These wires are connected to, for example, an image display system ECU (not shown) in the vehicle.

The flexible display 50 may be in a two sides arrangement. That is, the two flexible displays 50 are disposed to each other in the back-to-back. Thus, the image output from the flexible display 50 can be viewed from both the separation seat 14 and the bench seat 16.

A pair of sliders 52, 52 is attached to both ends of the flexible display 50 in the vehicle width direction. The sliders 52, 52 extend over the entire length of the flexible display 50. The sliders 52, 52 are flexible parts. For example, the sliders 52 are made of an elastic material such as rubber.

A pair of guide rails 56, 56 is provided at both ends of the flexible display 50 in the vehicle width direction. The guide rails 56, 56 are disposed on the roof trim 18, which is a ceiling of the vehicle compartment 10. The guide rails 56 extend in the longitudinal direction of the vehicle. The guide rails 56, 56 have, for example, a J-shaped cross section, and the inner side in the vehicle width direction is open.

The sliders 52, 52 are inserted into the guide rails 56, 56. The movement direction of the sliders 52 is regulated by the guide rails 56. That is, the sliders 52 move in the front-rear direction in the guide rails 56. The sliders 52, 52 and the flexible display 50 protruding from the guide rails 56, 56 move downward in accordance with gravity. In this way, the pair of guide rails 56 enables the flexible display 50 to slide between the retracted position and the spread position.

One end of a biasing component 58 is attached to a rear end 52A of the slider 52. The other end of the biasing component 58 is fixed to the rear end of the guide rail 56. The biasing component 58 is, for example, a spring. When the flexible display 50 is pulled out to the spread position by the occupant, the biasing component 58 is extended. When the engagement between the lock pin 70 and the pin receiving mechanism 40 is released, the flexible display 50 is returned to the retracted position by the elastic force of the biasing component 58.

Instead of using the biasing component 58, a motor (not shown) may move the flexible display 50.

Figure 5:
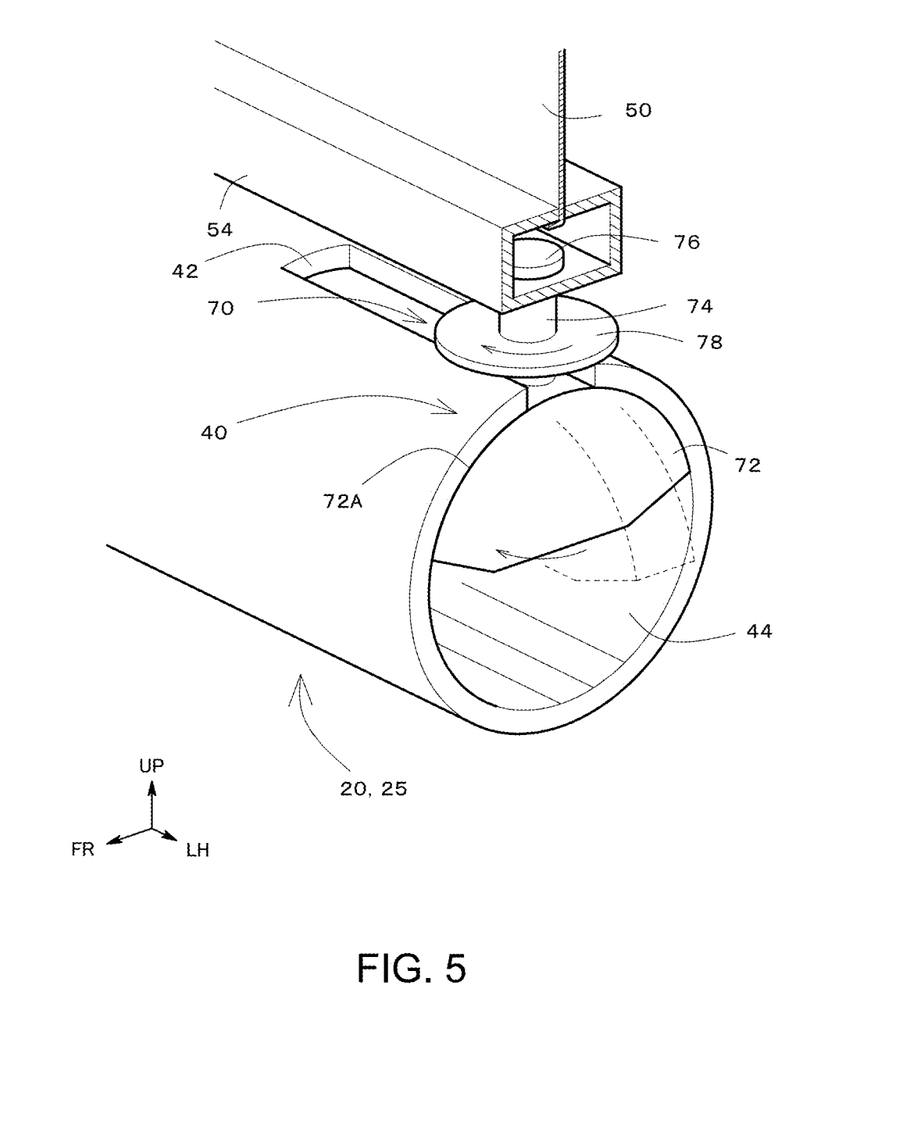

A bottom bar 54 is attached to a lower end of the flexible display 50. The bottom bar 54 connects the lower ends of the sliders 52, 52. The bottom bar 54 extends in the vehicle width direction. The bottom bar 54 has a predetermined stiffness. The bottom bar 54 is made of a metal material such as aluminum. As illustrated in FIG. 5, the bottom bar 54 has, for example, a rectangular tube shape and has a hollow structure.

As illustrated in FIG. 2, a first guide piece 60 is provided at one end of the bottom bar 54 in the vehicle width direction. A second guide piece 60 is provided at the other end of the bottom bar 54 in the vehicle width direction. A lock pin 70 is provided at the center of the bottom bar 54 in the vehicle width direction. In other words, the pair of guide pieces 60, 60 are disposed at the lower end of the flexible display 50 and at both ends in the vehicle width direction. A lock pin 70 is disposed at the lower end of the flexible display 50 and at the center in the vehicle width direction. The pair of guide pieces 60, 60 and the lock pin 70 are collectively referred to as a display-side engagement component. That is, the display-side engagement component is disposed at the lower end of the flexible display 50 in the spread position. As will be described later, in spreading the flexible display 50, the display-side engagement component engages the floor-side engagement component.

<Display-Side Engagement Component>

Figure 3:
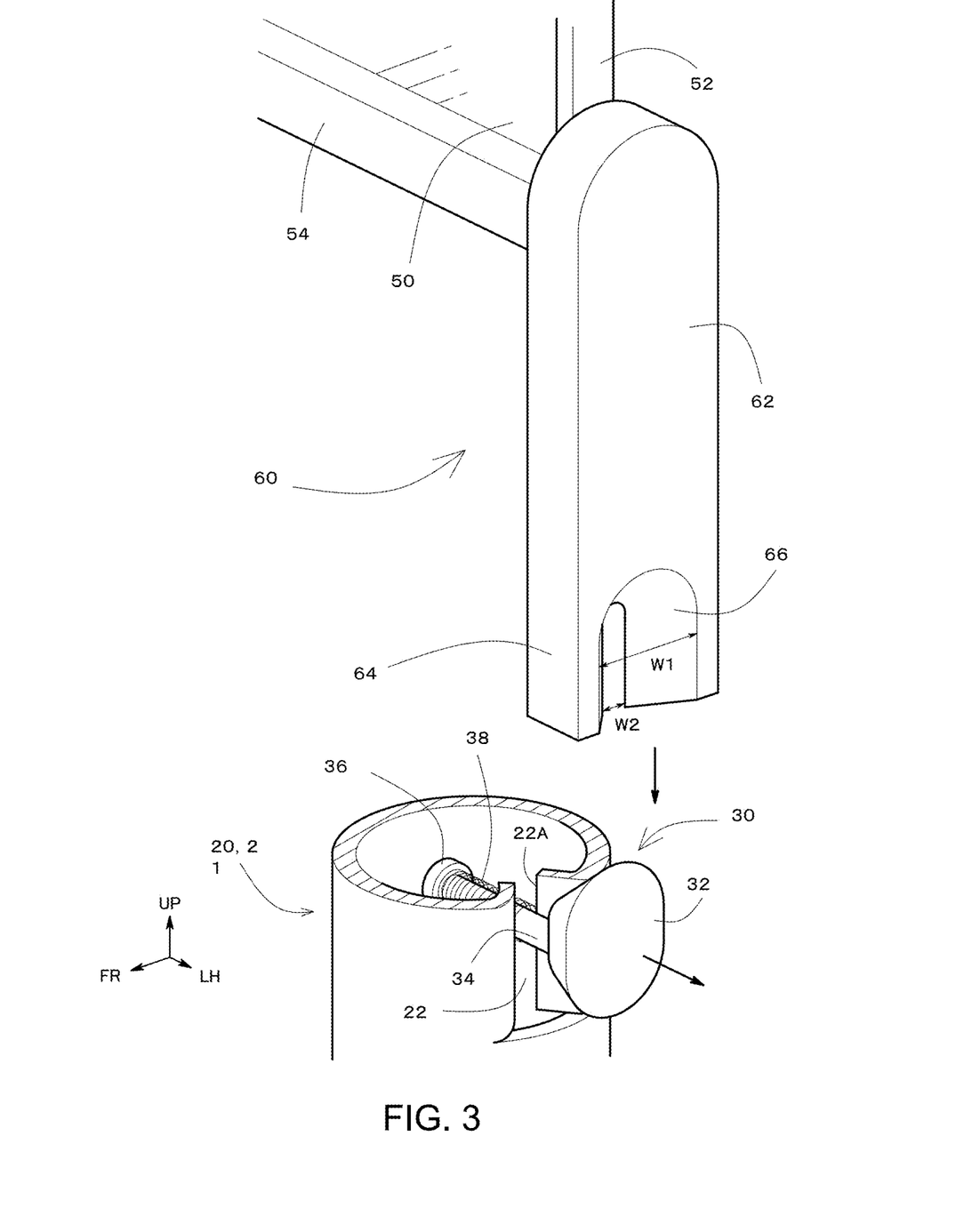

The display-side engagement component comprises a pair of guide pieces 60, 60 and a lock pin 70. FIG. 3 illustrates an enlarged perspective view of the guide piece 60. The guide piece 60 is elongated in the vertical direction. An upper end of the guide piece 60 is connected to the bottom bar 54.

The guide piece 60 includes a main body 62 and an insertion groove 64. The main body 62 is a plate piece extending in the vertical direction. An insertion groove 64 is provided at the lower end of the main body 62.

The insertion groove 64 is a U-shaped groove whose lower side is open. The side surface 66 of the insertion groove 64 is tapered. That is, as is apparent from comparison of the groove widths W1 and W2, the groove width of the insertion groove 64 becomes narrower toward the inner side in the vehicle width direction. As described later, when the flexible display 50 is spread, the head 32 of the hold pin 30 is inserted into the insertion groove 64.

Figure 4:
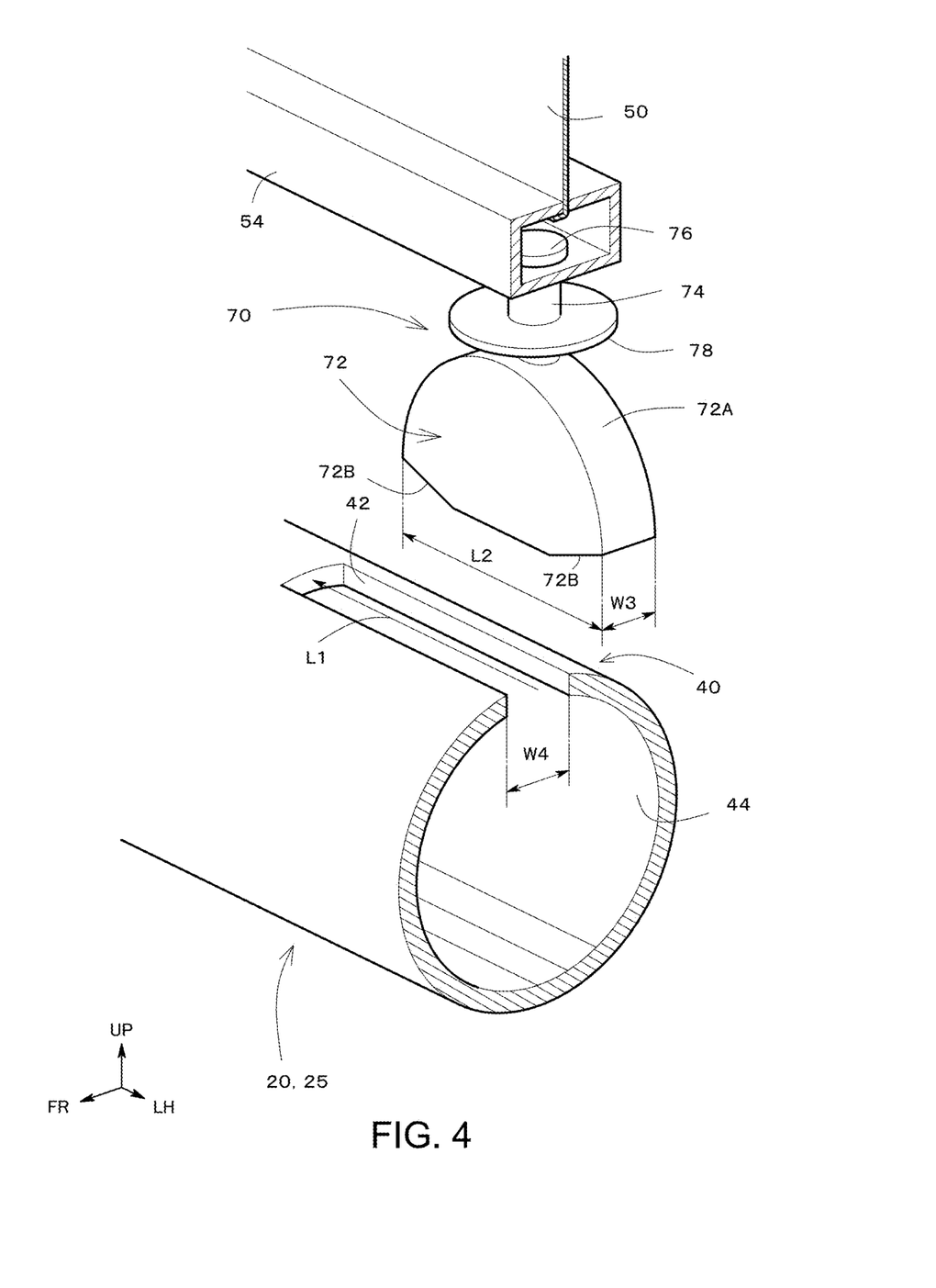

FIG. 4 is an enlarged perspective view of the lock pin 70. The lock pin 70 comprises a head 72, a rod 74, a stopper 76, and a disk 78.

The lock pin 70 is attached to the center of the bottom bar 54 in the vehicle width direction. For example, a through hole (not shown) is formed in the bottom wall of the bottom bar 54 in the thickness direction. The rod 74 is inserted into the through hole. A stopper 76 is fixed to the upper end of the rod 74. Thus, the lock pin 70 can rotate with respect to the bottom bar 54 about the rod 74. The rotation axis is parallel to the vertical axis (UP axis).

A head 72 is attached to the lower end of the rod 74. The head 72 is substantially fan-shaped and includes an contact surface 72A and a tapered surface 72B. The tapered surface 72B is formed at the lower end and both ends in the longitudinal direction of the head 72. The tapered surface 72B climbs outward from the center of the head 72. As described later, when the head 72 is inserted into the receiving port 42, the head 72 is guided in the vehicle width direction by the tapered surface 72B.

The contact surface 72A has a shape along the cross-sectional shape of the lateral bar 25 serving as the pin receiving mechanism 40. For example, the lateral bar 25 of the handrail 20 is a metal pipe and has a circular cross-sectional shape. Accordingly, the contact surface 72A has an arc shape. As shown in FIG. 5 described later, the contact surface 72A contacts with the inner peripheral surface 44 (inner wall surface) of the lateral bar 25. Thus, the lock pin 70 engages with the pin receiving mechanism 40.

A disk 78 is provided in the middle of the rod 74. The disk 78 is a disk for rotating the head 72. For example, when the flexible display 50 is spread, the disk 78 is turned by the occupant.

<Floor-Side Engagement Component>

As illustrated in FIG. 2, the floor-side engagement component is disposed on the handrail 20. The floor-side engagement component comprises a pair of hold pins 30, 30 and a pin receiving mechanism 40. The floor-side engagement component engages with the display-side engagement component from the floor 12 side (see FIG. 1) of the compartment 10.

As will be described later, when the flexible display 50 is spread, the display-side engagement component (guide piece 60, lock pin 70) engages the floor-side engagement component (hold pin 30, pin receiving mechanism 40). By this engagement, the lower end of the flexible display 50 is fixed to the floor 12 side (see FIG. 1).

As illustrated in FIG. 3, the hold pin 30 includes a head 32, a rod 34, a stopper 36, and a biasing component 38. The hold pin 30 is provided on the vertical bar 21 of the handrail 20. As illustrated in FIG. 2, a hold pin 30 is provided in each of the pair of vertical bars 21, 21. Accordingly, the first hold pin 30 is disposed at one end in the vehicle width direction in the region on the floor 12 side. The second hold pin 30 is disposed at the other end in the vehicle width direction in the region on the floor 12 side.

The vertical bar 21 has a cylindrical shape, and a slit 22 is cut in an outer portion in the vehicle width direction. The rod 34 is inserted into the slit 22. The rod 34 is a rod-shaped component extending in the vehicle width direction. The head 32 is connected to the outer end of the rod 34 in the vehicle width direction. A stopper 36 is connected to an inner end of the rod 34 in the vehicle width direction. The diameter of the stopper 36 is larger than the opening width of the slit 22.

A guide ring (not shown) may be provided in the slit 22. An opening axis of the guide ring is directed in the vehicle width direction. A rod 34 is inserted into the guide ring. The movement direction of the rod 34 is regulated in the vehicle width direction by the guide ring. The head 32 can also be moved in the vehicle width direction in conjunction with the rod 34.

The biasing component 38 is, for example, a spring. An outer end portion of the biasing component 38 in the vehicle width direction abuts on an end portion 22A of the slit 22. An inner end portion of the biasing component 38 in the vehicle width direction abuts against the stopper 36. With such a configuration, when the head 32 is pulled outward in the vehicle width direction, the biasing component 38 is contracted. As a result, the head 32 is biased inward in the vehicle width direction.

The head 32 may have a longitudinal shape. That is, the hold pin has a longer dimension in the vertical direction than the dimension in the front-rear direction. As illustrated in FIG. 3, the head 32 has an oval shape when viewed in the vehicle width direction.

As described later, when the flexible display 50 is spread, the hold pin 30 is inserted into the insertion groove 64 of the guide piece 60. At this time, the head 32 fits into the insertion groove 64. Since the hold pin 30 has a vertically long shape, rotation of the guide piece 60 around the central axis of the hold pin 30 is suppressed.

The semicircle of the upper end of the head 32 has, for example, the same diameter as the semicircle of the upper end of the insertion groove 64. The head 32 is trapezoidal in front view (FR axis view). In other words, the head 32 has a tapered shape that becomes narrower toward the inner side in the vehicle width direction. This taper angle is equal to the taper angle of the insertion groove 64.

In manufacturing the head 32 and the insertion groove 64, manufacturing tolerances are determined. Even if there is a difference between the taper angles of the head 32 and the insertion groove 64, the taper angles of the head 32 and the insertion groove 64 are regarded as equal if the difference is equal to or less than the manufacturing tolerance.

FIG. 4 is an enlarged perspective view of the pin receiving mechanism 40. In this example, the pin receiving mechanism 40 is formed in the lateral bar 25 of the handrail 20. That is, the pin receiving mechanism 40 has a hollow structure and further includes a receiving port 42. The receiving port 42 opens toward the ceiling of the vehicle compartment 10 (see FIG. 2).

In the example of FIG. 4, the lateral bar 25 of the handrail 20 is cylindrical and has a hollow structure. A receiving port 42 is formed at the center of the lateral bar 25 in the vehicle width direction. In this way, the pin receiving mechanism 40 is formed using the hollow structure of the lateral bar 25. The slit width W4 of the receiving port 42 exceeds the width W3 of the head 72 of the lock pin 70. The opening length L1 of the receiving port 42 exceeds the entire length L2 of the head 72.

Figure 6:
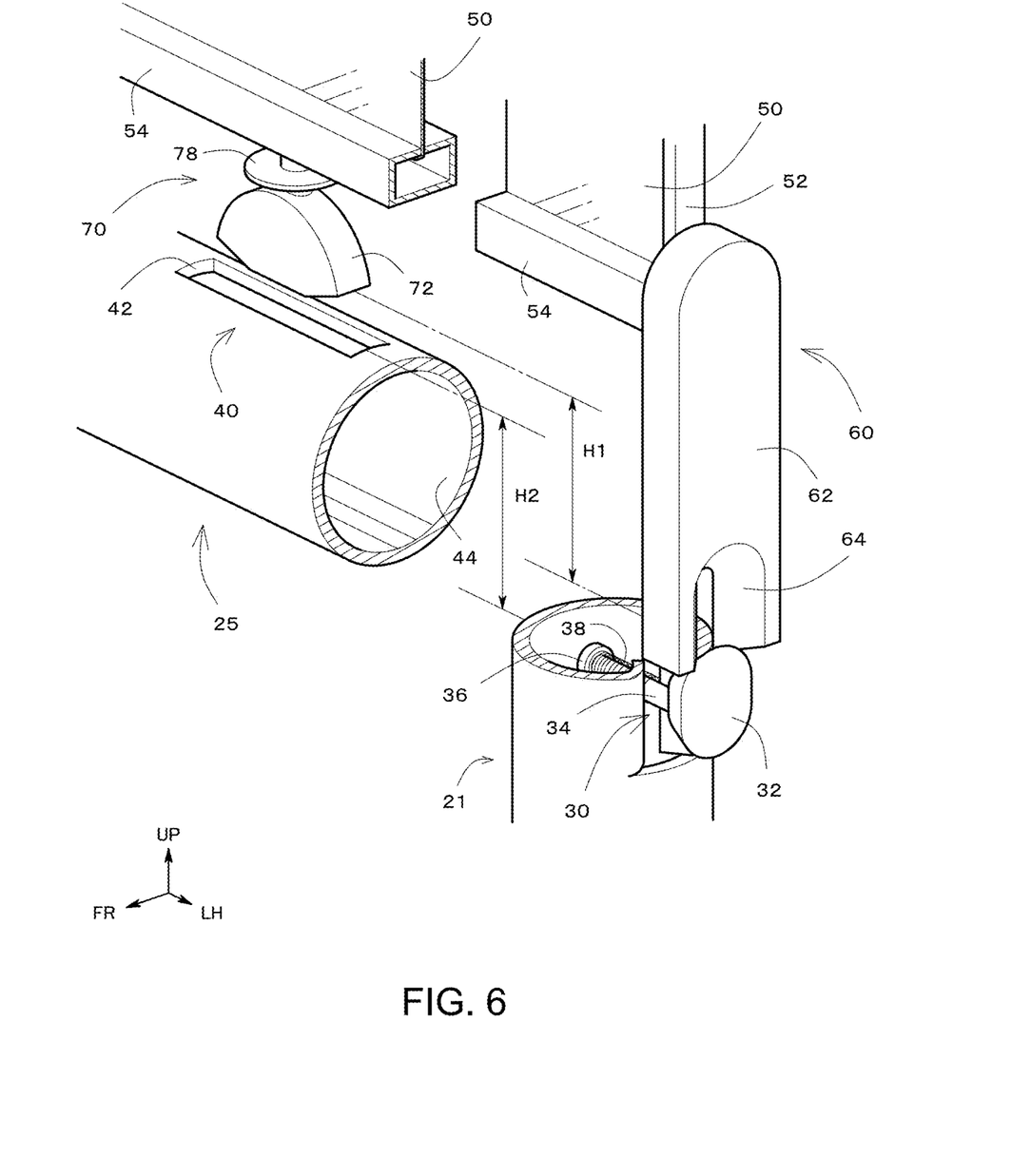

FIG. 6 shows an example of the height positions of the display-side engagement component and the floor-side engagement component. With respect to the floor-side engagement component, a pair of hold pins 30, 30 are disposed below the receiving port 42 of the pin receiving mechanism 40. Further, the insertion grooves 64 provided in the pair of guide pieces 60, 60 are disposed below the lock pin 70 for the display-side engagement component.

Here, the separation distance H1 between the lower end of the lock pin 70 and the lower end of the insertion groove 64 is equal to the separation distance H2 between the receiving port 42 and the hold pin 30. With such a structure, when the hold pin 30 is inserted into the insertion groove 64, the head 72 of the lock pin 70 is inserted into the receiving port 42 in parallel. That is, the flexible display is rapidly spread.

<Display Spread Process>

Referring to FIGS. 2-4, the flexible display 50 in the retracted position is pulled down to the occupant. This drawing operation is executed by, for example, two occupants. For example, the occupant pulls the flexible display 50 forward and downward with holding the bottom bar 54.

Next, as illustrated in FIG. 3, the head 32 of the hold pin 30 is pulled out from the vertical bar 21. In other words, the head 32 is pulled outward in the vehicle width direction. Further, the guide piece 60 is lowered. Thereby, the head 32 is inserted into the insertion groove 64.

The head 32 is biased inward in the vehicle width direction by the elastic force of the biasing component 38. The insertion groove 64 is sandwiched between the head 32 and the vertical bar 21. Referring to FIG. 2, by engaging the pair of guide pieces 60 with the pair of hold pins 30, positioning of flexible display 50 in the vehicle front-rear direction and the vehicle width direction is completed.

In parallel with the process of inserting the insertion groove 64 of the guide piece 60 into the head 32, the head 72 of the lock pin 70 (see FIG. 4) is inserted into the receiving port 42 of the pin receiving mechanism 40. Thereafter, as illustrated in FIG. 5, the disk 78 is turned by the occupant, and the head 72 rotates. By the rotation, the contact surface 72A of the head 72 fits in the inner peripheral surface 44 of the lateral bar 25. As a result, the head 72 of the lock pin 70 is hooked on the inner wall surface of the pin receiving mechanism 40, that is, the inner peripheral surface 44 of the lateral bar 25. By this hooking, the flexible display 50 is fixed to the floor 12 side region (see FIG. 1).

At both ends of the flexible display 50 in the vehicle width direction, a pair of guide pieces 60, 60 are engaged with a pair of hold pins 30, 30. Therefore, even when the outside air blows into the vehicle compartment 10, the waving of the flexible display 50 is suppressed.

<Another Example of a Vehicle-Mounted Retractable Display Device>

In the vehicle-mounted retractable display device illustrated in FIGS. 1 to 6, the floor-side engagement component is mounted on the handrail 20. However, the vehicle-mounted retractable display device disclosed in this specification is not limited to this embodiment.

Figure 7:
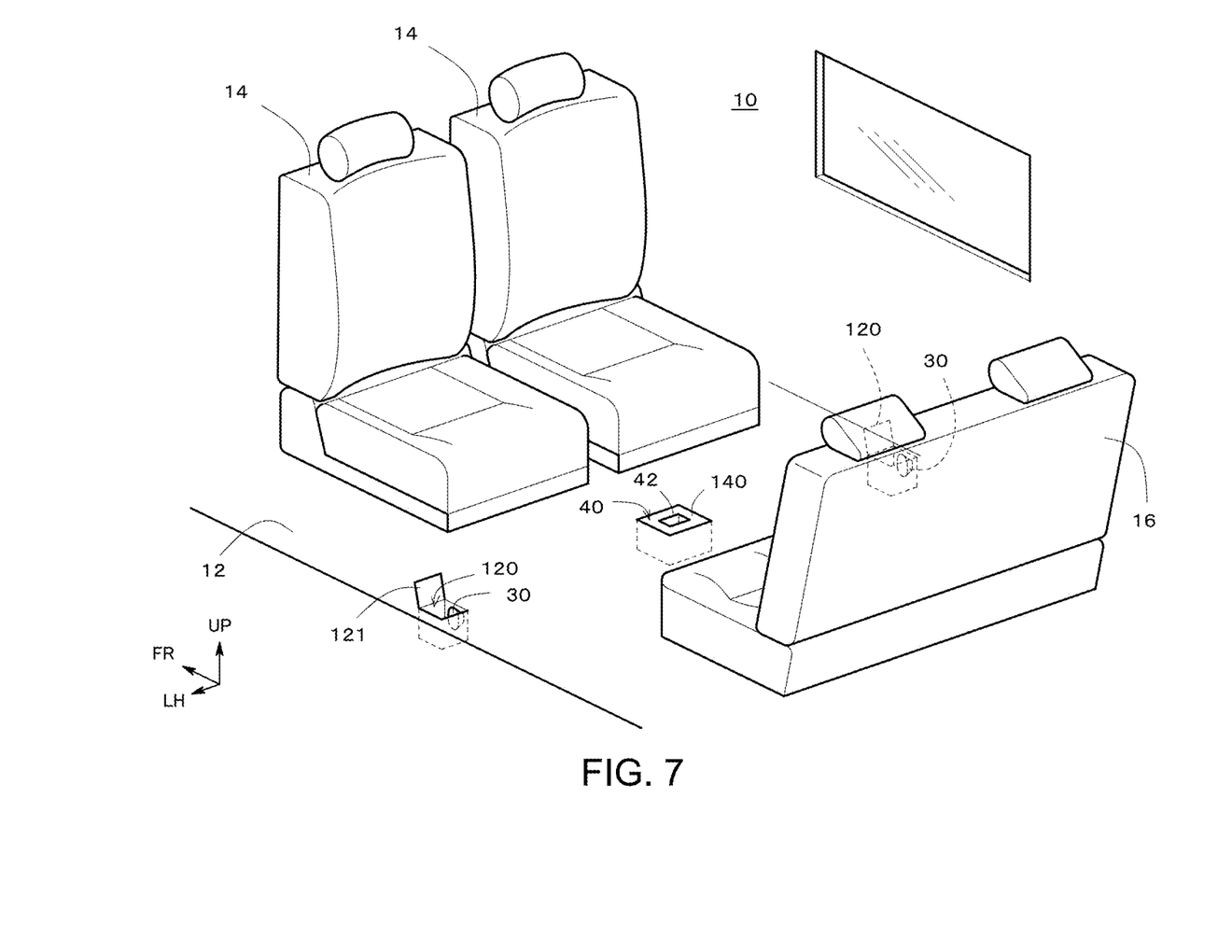
FIG. 7 shows of an illustrative another example of the vehicle-mounted retractable display device according to the present embodiment in a high angle.

For example, FIG. 7 illustrates a mode in which the handrail 20 is removed from the vehicle compartment 10. In this case, the floor-side engagement component is disposed on the floor 12 of the vehicle compartment 10. That is, a pair of housing cases 120, 120 and a receiving case 140 are embedded in the floor 12.

A pair of housing cases 120, 120 is disposed at both ends of the floor 12 in the vehicle width direction. The hold pin 30 is housed in the housing case 120. The upper portion of the housing case 120 is covered with a cover 121. When the flexible display 50 is spread, the cover 121 is opened.

A pin receiving mechanism 40 is disposed at the center of the floor 12 in the vehicle width direction. The pin receiving mechanism 40 includes a receiving case 140. The receiving case 140 has a hollow structure, and has a receiving port 42 opened toward the ceiling. When the flexible display 50 is spread, the lock pin 70 (see FIG. 2) engages with the receiving case 140.

The present disclosure is not limited to the present embodiments described above, and includes all changes and modifications without departing from the technical scope or the essence of the present disclosure defined by the claims.

The invention claimed is:

1. A vehicle-mounted retractable display device, comprising:

a flexible display disposed in a vehicle compartment, the flexible display extending in a vehicle width direction;

a guide rail disposed on a ceiling of the vehicle compartment, the guide rail guiding movement of the flexible display from a retracted position to a spread position, wherein, in the retracted position, the flexible display rests on the ceiling, and in the spread position, the flexible display is pulled down to a region in front of a seat;

a display-side engagement component disposed at a lower end of the flexible display; and a floor-side engagement component disposed in a lower region of the vehicle compartment and configured to engage the display-side engagement component, wherein the floor-side engagement component comprises a pair of hold pins, in which a first hold pin in the pair of hold pins is disposed on a first end, in the vehicle width direction, of the floor-side engagement component, and a second hold pin is disposed on a second end that is distally opposite from the first end, in the vehicle width direction, of the floor-side engagement component;

each of the pair of hold pins comprises a head and a biasing component, the head being movable in the vehicle width direction, and the biasing component being configured to bias the head inward in the vehicle width direction;

the display-side engagement component comprises a pair of guide pieces, in which a first guide piece in the pair of guide pieces is disposed at the lower end on one end, in the vehicle width direction, of the flexible display, and a second guide piece in the pair of guide pieces is disposed at the lower end on another end, in the vehicle width direction, of the flexible display;

each guide piece in the pair of guide pieces comprises an insertion groove having a lower opening into which the head of one of the pair of hold pins is inserted;

the head is tapered toward an inner region in the vehicle width direction; and the insertion groove has a tapered contour, and has a groove width getting narrower toward the inner region in the vehicle width direction.

2. The vehicle-mounted retractable display device according to claim 1, wherein the head has a vertically elongated shape having a vertical dimension longer than a dimension in a front-rear direction of a vehicle.

3. The vehicle-mounted retractable display device according to claim 2, wherein the display-side engagement component comprises a lock pin disposed at a center, in the vehicle width direction, of the flexible display on the lower end thereof;

the floor-side engagement component comprises a pin receiving mechanism disposed at a center, in the vehicle width direction, of the floor-side engagement component;

the pin receiving mechanism has a hollow structure, and has a receiving port which is open toward the ceiling; and when the flexible display is secured, the lock pin is inserted into the pin receiving mechanism from the receiving port, and the lock pin is hooked on an inner wall of the pin receiving mechanism.

4. The vehicle-mounted retractable display device according to claim 3, wherein the insertion groove is located below the lock pin; and the pair of hold pins is located below the receiving port; and a separation distance between a lower end of the lock pin and a lower end of the insertion groove is equal to a separation distance between the receiving port and each of the pair of hold pins.

* * * * *